(12) United States Patent
Hwang

(10) Patent No.: US 7,527,408 B2
(45) Date of Patent: May 5, 2009

(54) BACKLIGHT UNIT HAVING HEAT DISSIPATING LAYER, DISPLAY DEVICE HAVING HEAT DISSIPATING LAYER, AND METHOD FOR MANUFACTURING HEAT DISSIPATING LAYER

(75) Inventor: Kab Jin Hwang, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 11/506,852

(22) Filed: Aug. 21, 2006

(65) Prior Publication Data

US 2007/0091588 A1    Apr. 26, 2007

(30) Foreign Application Priority Data

Oct. 24, 2005    (KR) ............... 10-2005-0100342
Feb. 8, 2006    (KR) ............... 10-2006-0012265

(51) Int. Cl.
*F21V 7/04* (2006.01)

(52) U.S. Cl. ............... 362/609; 362/294; 362/610; 362/615

(58) Field of Classification Search ............... 362/294, 362/373, 612, 614, 615, 617
See application file for complete search history.

(56) References Cited

U.S. PATENT DOCUMENTS 5,742,366 A    4/1998    Imoto
6,835,453 B2    12/2004    Greenwood et al.
2003/0043586 A1    3/2003    Sagal et al.
2003/0090901 A1    5/2003    Moon
2004/0032725 A1    2/2004    Hsieh et al.
2004/0251804 A1    12/2004    McCullough et al.
2005/0014867 A1    1/2005    Gulari et al.
2005/0179352 A1    8/2005    Hayashi et al.
2005/0254259 A1*    11/2005    Yamashita et al. .......... 362/621
2006/0098457 A1*    5/2006    Chen et al. .................. 362/632

FOREIGN PATENT DOCUMENTS

| CN | 1580896 A | 2/2005 |
|---|---|---|
| EP | 0 226 361 A1 | 6/1987 |
| JP | 2001-31880 A | 2/2001 |
| JP | 2004-101693 A | 4/2004 |
| TW | 1235635 | 7/2005 |
| TW | 200716733 | 5/2007 |
| TW | 200717106 | 5/2007 |

* cited by examiner

*Primary Examiner*—Sandra L. O'Shea
*Assistant Examiner*—Meghan K. Dunwiddie
(74) *Attorney, Agent, or Firm*—Birch, Stewart, Kolasch & Birch, LLP

(57) ABSTRACT

A backlight unit and a display device having heat dissipating layer, and a method for manufacturing the heat dissipating layer are provided. A backlight unit includes a light source for emitting a light; a reflector below the light source for reflecting the light emitted from the light source and absorbing heat generated by the light source; and a heat dissipating layer including thermal conductive particles, the heat dissipating layer being disposed on a first surface of the reflector for dissipating the heat transferred to the reflector.

17 Claims, 2 Drawing Sheets

BACKLIGHT UNIT HAVING HEAT DISSIPATING LAYER, DISPLAY DEVICE HAVING HEAT DISSIPATING LAYER, AND METHOD FOR MANUFACTURING HEAT DISSIPATING LAYER

CROSS-REFERENCE TO RELATED APPLICATIONS

This Nonprovisional Application claims priority under 35 U.S.C. §119(a) on Patent Application No. 10-2005-0100342 filed on Oct. 24, 2005, and No. 10-2006-0012265 filed on Feb. 8, 2006, the entire contents of which are hereby incorporated by reference.

BACKGROUND OF THE INVENTION

1. Field of the Invention

The present invention relates to a backlight unit including a heat dissipating layer. Particularly, the present invention relates to a backlight unit including a heat dissipating layer capable of improving temperature characteristics of a display device, a display device including a heat dissipating layer, and a method for manufacturing a heat dissipating layer.

2. Description of the Related Art

A Liquid Crystal Display device (LCD device) is an electrical device which changes electrical data into visual data, and displays them by varying the liquid crystal transmisstance according to an applied voltage.

The LCD device is a device for displaying information, but cannot emitting the light by itself. Thus, the LCD device needs an extra device as a light source to uniformly brighten the entire screen from the rear surface of the LCD device. A Back Light Unit (BLU) is used to provide a light to the screen of the LCD device.

The BLU is classified into a direct-light type and an edge-light type according to the installed position of a light source. In the direct-light type BLU, the light source is disposed under a liquid crystal panel, and in the edge-light type BLU, the light source is disposed on a lateral side of a light guiding plate.

The edge-light type BLU comprises a light source unit, a light guiding plate, a reflector, and an optical film. The light source unit comprises at least one light source generating a light with a predetermined wavelength, and a light source reflector. The light generated from the light source is reflected by the light source reflector made of reflective material, and the reflector. Then, the reflected light is diffused uniformly through the entire light guiding plate. The optical film comprises a diffuser, a prism sheet, and a protection sheet.

The function of each element in the optical film is explained as follows. The light uniformly diffused in the light guiding plate passes through the diffuser. The diffuser diffuses or condenses the light passing through the light guiding plate so that the brightness becomes uniform and the viewing angle becomes wider.

The brightness of the light passing through the diffuser is remarkably decreased. To solve this problem, a prism sheet is used. The prism sheet refracts the light passing through the diffuser, and converges the light incident in a low angle to the direction substantially perpendicular to the prism sheet so that the brightness is increased within the range of the effective viewing angle. The protection sheet is disposed on the prism sheet. to prevent the prism sheet from being damaged, and makes the narrowed viewing angle wider.

A Cold Cathode Fluorescent Lamp (CCFL) is used mainly as the light source of the BLU. As the BLU installed to a liquid crystal panel emits the light, the inside temperature of the LCD device is increased, and the temperature of the CCFL is increased up to 80° C. to 90° C. Thus, the efficiency of the BLU is lowed, and the brightness of the LCD device is decreased.

Unlike the edge-light type BLU, the direct-light type BLU has a reflector under the light source. In this structure, most heat generated from the light source is transferred to the reflector. The reflector is overheated by the transferred heat, and thus may be deformed.

In addition, although it may be different according to the type of BLU, most heat generated from the CCFL is transferred to the liquid crystal panel disposed on the front surface of the BLU. Therefore, a temperature difference among the liquid crystal cells may occur. Such a temperature difference among the liquid crystal cells causes the response speed difference among the liquid crystal cells, which causes the brightness difference of the LCD device.

A Plasma Display Panel (PDP) is a light-emitting display device having a plurality of discharge cells disposed between a pair of glass substrate. Unlike the LCD device, the PDP does not need an extra light source. However, in the PDP, the discharge cell that is activated to emit a light for displaying an image generates heat. Therefore, the temperature of the PDP is increased. That is, the heat generated in the discharge cell is transferred to a glass substrate, but is not transferred in a parallel direction to a panel surface due to the low thermal conductivity of the glass material having.

In addition, the temperature of the activated discharge cell is increased remarkably, but the temperature of the non-activated discharge cell is not increased as much as the activated discharge cell. Thus, the temperature of the panel is increased non-uniformly in an image-forming area. This temperature difference affect the lifetime of the discharge cells.

Besides the LCD device or PDP described above, such a problem occurs in a display device using an light emitting diode or organic electroluminescent device, affect the durability or the display quality of the device.

Thus, there has been a need to provide a solution that can transfer the heat generated in the device to the outside effectively.

SUMMARY OF THE INVENTION

An object of the present invention is to provide a backlight unit (BLU) including a heat dissipating layer which can effectively increase the brightness by reducing the temperature difference of a panel surface, a display device including a heat dissipating layer, and a method for manufacturing a heat dissipating layer, in order to resolve the above-described problems occurred in display devices.

Another object of the present invention is to provide a BLU including a heat dissipating layer which can increase the brightness by reducing the temperature increase of a light source, a display device having a heat dissipating layer, and a method for manufacturing a heat dissipating layer.

Another object of the present invention is to provide a BLU including a heat dissipating layer which can absorb heat transferred to a reflector, a display device having a heat dissipating layer, and a method for manufacturing a heat dissipating layer.

In one aspect of the present invention, a backlight unit, as embodied, comprises: a light source for emitting a light; a reflector below the light source for reflecting the light emitted from the light source and absorbing heat generated by the light source; and a heat dissipating layer including thermal conductive particles, the heat dissipating layer being disposed on a first surface of the reflector for dissipating the heat transferred to the reflector.

In another aspect of the present invention, a display device, as embodied, comprises: a display panel for displaying an image by using a light; a light source for emitting the light; a reflector below the light source for reflecting a light emitted from the light source and absorbing heat generated by the light source; and a heat dissipating layer including thermal conductive particles, the heat dissipating layer being disposed on a first surface of the reflector for absorbing the heat transferred to the reflector.

In another aspect of the present invention, a method for manufacturing a heat dissipating layer, as embodied, comprises: forming a mixture by mixing a graphite powder, a binder and a curing agent; and forming the heat dissipating layer by applying the mixture onto a first surface of a reflector.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF THE ILLUSTRATED EMBODIMENTS

The present invention will be more clearly understood from the detailed description in conjunction with the following drawings.

Figure 1:
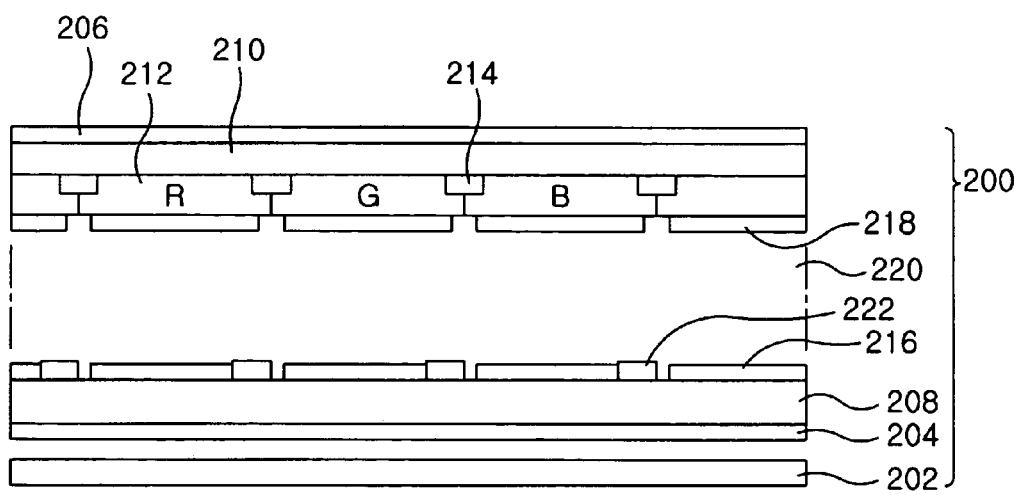
FIG. 1 is a cross-sectional view showing a liquid crystal display device using the backlight unit (BLU) according to an embodiment of the present invention.
Figure 2:
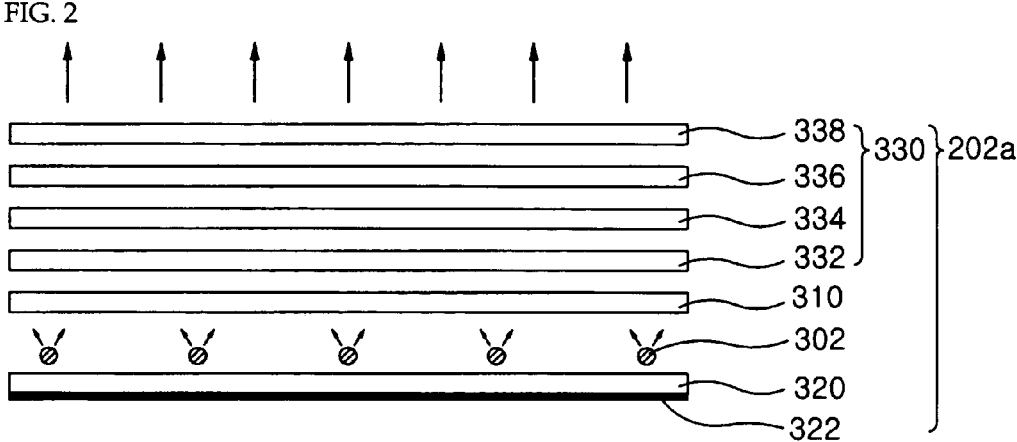
FIG. 2 is a cross-sectional view schematically showing the direct-light type BLU according to an embodiment of the present invention.
Figure 3:
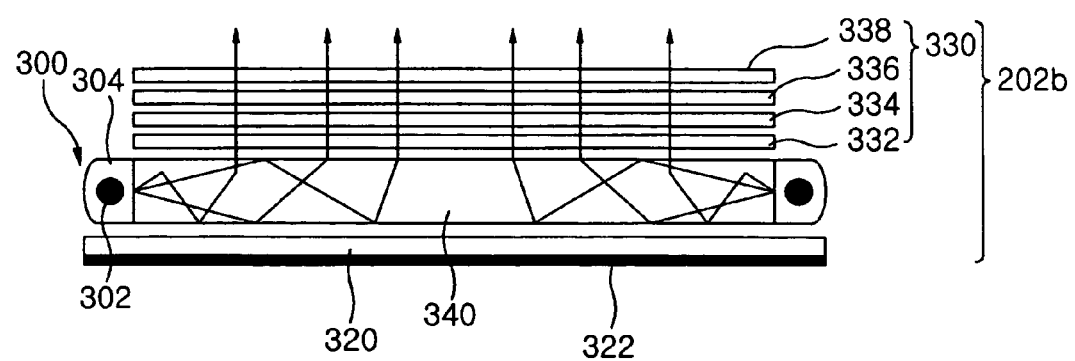
FIG. 3 is a cross-sectional view schematically showing the edge-light type BLU according to an embodiment of the present invention.

FIG. 1 is a cross-sectional view showing liquid crystal display device using the backlight unit (BLU) according to an embodiment of the present invention. FIG. 2 is a cross-sectional view schematically showing the direct-light type BLU according to an embodiment of the present invention. FIG. 3 is a cross-sectional view schematically showing the edge-light type BLU according to an embodiment of the present invention.

In FIG. 1, a liquid crystal display device (LCD device) comprises a liquid crystal panel (LC panel) 200 and a backlight unit (BLU) 202. The LC panel 200 comprises a lower polarizing film 204, an upper polarizing film 206, a lower substrate 208, an upper substrate 210, color filters 212, black matrixes 214, pixel electrodes 216, common electrodes 218, a liquid crystal layer 220, and TFT arrays 222. The color filters 212 include red, green and blue color filters, and generate an image in case that a light is applied thereto. The TFT arrays 222 as a switching element to selectively apply the data to the pixel electrode 216.

The voltage applied between the common electrodes 218 and the pixel electrodes 216 changes the alignment direction of the liquid crystal molecules of the liquid crystal layer 220 to thereby change the light transmisstance of the liquid crystal layer 220. The liquid crystal layer 220 has liquid crystal molecules, and the liquid crystal molecules are aligned according to the voltage difference between the pixel electrodes 216 and the common electrodes 218. As a result, a light provided from the BLU 202 is incident to the color filters 212 according to the alignment direction of the liquid crystal molecules of the liquid crystal layer 220.

The BLU 202 is disposed at a lower part of the LC panel 200, and provides a light, for example, a white light, to the LC panel 200. The BLU 202 is classified into a direct-light type and an edge-light type according to the installed position of a light source. In the direct-light type BLU, the light source is disposed under the LC panel, and in the edge-light type BLU, the light source is disposed on a lateral side of a light guiding plate. The present invention can be applied to both the direct-light type BLU and the edge-light type BLU.

IN FIG. 2, the direct-light type BLU 202a comprises a light source 302, a transparent plate 310, a reflector 320, a heat dissipating layer 322 and an optical film 330. The light source 302 includes a plurality of Cold Cathode Fluorescent Lamps (CCFL) that can provide a very bright white light. In addition to the CCFL, a light emitting diode (LED) or an external electrode fluorescent lamp (EEFL) may also be used as the light source 302.

When using the LEDs as the light source, the LEDs with red, green and blue colors, or one white color can be used. In case of the BLU 202a using the LEDs as the light source, the light uniformity can be maintained and the miniaturization of the BLU 202a and efficiency of the light can be improved.

The EEFL has better brightness than the CCFL, and is better to operate in parallel because the electrode is external. In particular, the EEFL can reduce the cost and weight of the LCD module because the number of the inverters needed is lower than a conventional light source.

The reflector 320 disposed under the light source 302 reflects the light from the light source 302 back to the transparent plate 310. The reflector 320 according to an embodiment of the present invention can be made by coating silver on a sheet consisting of SUS (stainless steel), brass, aluminum, PET, etc., and coating titanium to prevent deformation due to the heat absorption for a long period of time. In addition the reflector 320 according to another embodiment of the present invention can be made by dispersing bubbles on a sheet of plastics like PET for diffusing the light.

In addition, the light efficiency may be improved by installing the light source 302 in which a light source reflector (not shown) is disposed under the light source 302, and making the light from the light source 302 incident to the diffuser. The light source reflector is made of highly reflective material, and may be made by coating silver to the surface.

In addition, the heat generated from the light source 302 during the light generation process is transferred to the reflector 320 disposed under the light source 302. Thus, the heat dissipating layer 322 is formed under the reflector 320 in order to dissipate the heat transferred to the reflector 320. The heat dissipating layer 322 will be described later.

The transparent plate 310 transmits the light incident from the light source 302. The transparent plate 310 is made of poly methyl methacrylate (PMMA), poly ethylene terephthalate (PET) or poly carbonate (PC), etc. Preferably, the transparent plate 310 uses poly methyl methacrylate (PMMA). In the direct-light type BLU 202a, a plurality of light sources 302 are disposed under the LC panel 200. Therefore, the bright line pattern corresponding to the shape of the light sources 302 appears on top of the LC panel 200. The transparent plate 310 has a pattern to play a role in transmitting the light generated from the light source 302 while removing the bright line pattern. However, in the illustrated BLU 202a, a transparent plate 310 on which a pattern is not formed can be also used.

The optical film 330 comprises a diffuser 332, a prism sheet 334, a protection sheet 336 and a polarizer 338. The diffuser 332 diffuses or condenses an incident light so that brightness becomes uniform and the viewing angle becomes wider. The brightness of the light passing through the diffuser 332 is remarkably decreased. To solve this problem, a prism sheet 334 is used. The prism sheet 334 condenses a part of the light diffused or condensed by the diffuser into the direction of the protection sheet 336, and reflects the other light into the direction of the diffuser 332. The protection sheet 336 is disposed on the prism sheet 334 to prevent the prism sheet 334 from being damaged, and makes the narrowed viewing angle wider. The polarizer 338 reflects a part of the light diffused by the protection sheet 336 into the direction of the light source 302, and provides the other light to the LC panel 200. That is, the polarizer 338 plays a role in allowing certain polarized light to pass therethrough, and reflect the other polarized light.

For example, the polarizer 338 allows a longitudinal wave (P wave) component in the light diffused by the protection sheet 336 to pass therethrough, and reflects a transverse wave (S wave) component into the direction of the transparent plate 310. The transverse wave reflected by the polarizer 338 is re-reflected by the reflector 320. In this case, according to the physical nature of light, the re-reflected light includes a longitudinal wave component and a transverse wave component. That is, the transverse wave component reflected by the polarizer 338 becomes a light including the longitudinal wave component and the transverse wave component.

Next, the re-reflected light is incident to the polarizer 338 by passing the diffuser 332, the prism sheet 334 and the protection sheet 336. As a result, the longitudinal wave component in the re-reflected light passes through the polarizer 338, and the transverse wave component is reflected into the direction of the diffuser 332. Then, the reflected light is re-reflected by the reflector 320, and changed to a light including the longitudinal wave component and the transverse wave component. In addition, one or both of the protection sheet 336 and the polarizer 338 can be used. The BLU 202a improves the efficiency by repeating the above process.

In FIG. 3, the edge-light type BLU 202b comprises a light source unit 300, a light guiding plate 340, a reflector 320, a heat dissipating layer 322, and an optical film 330. The light source unit 300 includes one and more light sources 302 and a light source reflector 304. The light source 302 generates a light having a certain wavelength. The light source 302 can be the CCFL, the LED and the EEFL, etc. as described above.

The light source reflector 304 reflects the light from the light source 302 to the light guiding plate 340 and increases the amount of light incident to the light guiding plate 340. The light generated from the light source 302 is reflected by the light source reflector 304 and the reflector 320. Then, the reflected light is diffused uniformly through the entire light guiding plate 340.

The reflector 320 disposed under the light source unit 300 reflects the light from the light source 302 back to the light guiding plate 340. The reflector 320 can be made by coating silver on a base material consisting of aluminum, etc. to increase the reflection rate, and coating titanium to prevent deformation at the time of heat generation.

In addition, the heat generated from the light source 302 during the light generation process is transferred to the reflector 320 disposed under the light source 302. Thus, a heat dissipating layer 322 is formed under the reflector 320 in order to dissipate the heat transferred to the reflector 320. In addition, the reflector and the heat dissipating layer 322 extend to be directly below the light source reflector 304 for absorbing the heat transferred from the light source 302 to the light source reflector 304. The heat dissipating layer 322 will be described below.

The optical film 330 comprises a diffuser 332, a prism sheet 334, a protection sheet 336 and a polarizer 338. The light diffused uniformly in the light guiding plate 340 passes through the diffuser 332. The diffuser 332 diffuses or condenses the light passing the light guiding plate 340 so that the brightness becomes uniform and the viewing angle becomes wider. Here, the constructions and characteristics of the prism sheet 334, the protection sheet 336, and the polarizer 338 are the same as described for the direct-light type of the BLU 202a, and therefore will not be described here.

Hereinafter, the light-emitting process of the LCD device will be described. In FIG. 1, the BLU 202 provides a light to the LC panel 200. Next, the TFT arrays 222 selectively turn on to apply the data to the pixel electrodes 216. Then, a voltage difference between the pixel electrodes 216 and the common electrodes 218 is applied, resulting in aligning the liquid crystal layer 220 according to the voltage difference. In this case, while the light provided from the BLU 202 passes through the liquid crystal layer 220, the radiation intensity is controlled, and such a controlled light is provided to the color filters 212. As a result, the color filters 212 embody an image with certain gray levels. In detail, the red, green and blue color filters form one pixel, and the pixel embodies an image by the combination of light passing through the red, green and blue color filters.

Figure 4:
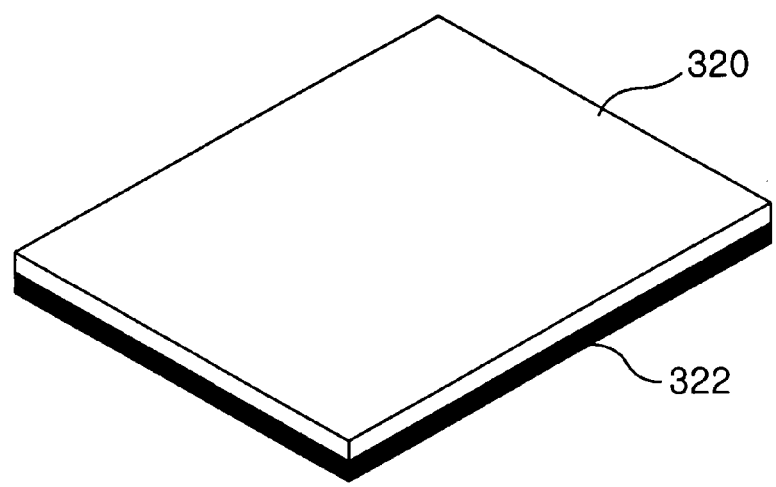
FIG. 4 is a perspective view showing the relation of the reflector and the heat dissipating layer according to an embodiment of the present invention.

Hereinafter, the heat dissipating layer 322 formed on the BLU 202 according to the present invention will be described. FIG. 4 is a perspective view showing the relation of the reflector and the heat dissipating layer. In FIG. 4, the heat dissipating layer 322 is formed on the bottom surface of the reflector 320 to dissipate the heat transferred to the reflector 320. In detail, the heat dissipating layer 322 is formed by applying a mixture onto the bottom surface of the reflector 320 and drying the mixture.

The heat dissipating layer 322 can absorb the heat transferred to the reflector 320 effectively because of the superior thermal conductivity of the heat dissipating layer 322. In addition, the heat dissipating layer 322 can prevent excessive temperature increase of the light source 302 since the heat dissipating layer 322 absorbs and dissipates the heat generated from the light source 302 effectively. Thus, the light source 302 maintains a temperature that can provide better efficiency even if the LCD device is driven for a long time. The temperature at the surface of the LC panel 200 is partly increased in a cell area emitting a light of high brightness and such partial temperature difference causes the response speed difference of the liquid crystals. This will decrease the brightness of the LCD device.

In the illustrated embodiments, the heat dissipating layer 322 formed on the bottom surface of the reflector 320 absorbs the heat generated in the LC panel 200 efficiently to make the temperature of the LC panel 200 more uniform. As shown above, the heat dissipating layer 322 can reduce the brightness decrease of the LCD device.

The heat dissipating layer 322 is manufactured by using thermal conductive particles, such as a graphite powder, copper, silver, aluminum, a mixture thereof, etc., that have superior thermal conductivity so that the heat dissipating layer 322 can absorb the heat transferred to the reflector 320 and dissipate the heat to the outside the LCD device. When using only the graphite powder to manufacture the heat dissipating layer 322, it may be easily broken due to the physical characteristics of the graphite.

To further enhance the strengthen of the heat dissipating layer 322, in an embodiment of the present invention, the mixture forming the heat dissipating layer 322 can be a liquid mixture including a graphite powder, a binder, a curing agent and a filler. In another embodiment, the liquid mixture can further include a dispersing agent and a solvent. In still another embodiment, the liquid mixture can further include a leveling agent, a wetting agent, polybasic acid and acid anhydride.

For the binder, it is desirable to use a material having superior thermal conductivity and thermal resistance like polyester resin, urethane resin, epoxy resin, acryl resin, etc. In particular, the binder is at least one selected from the group consisting of polyester resin having carboxyl end-group, polyester resin having hydroxyl end-group, epoxy resin having oxirane functional group, acryl resin having carboxyl end-group, acryl resin having hydroxyl end-group, acryl resin having GMA end-group and urethane resin.

The binder integrates graphite powder particles. Therefore, the bonding of graphite powder particles is not easily broken thanks to the binder even though an external force is exerted on the heat dissipating layer. Therefore, the strength of the heat dissipating layer can be further enhanced.

The physical and chemical properties of polyurethane of the materials used as the binder are shown as follows. Polyurethane is rubber-state elastic body of polymer compounds having urethane bond —OCONH— within the molecule. Recently, the use of polyurethane has been extended to various fields such as urethane rubbers, synthetic fibers, adhesives, paints, urethane forms, automobile bumpers, etc. Generally, polyurethane is prepared by adding polymerization of diol (e.g. 1,4-butandiol, etc.) and di-isocyanate (diphenylmethane di-isocyanate, etc.). For rubber, polyetherdiol such as polyethyleneglycol and polypropyleneglycol, and aliphatic polyester of terminal diol are used as diol. For urethane form, polyurethane is usually used in the thermosetting form by adding tri-isocyanate.

The curing agent makes the liquid mixture applied to the reflector 320 easily dried and cured. The curing agent is at least one selected from the group consisting of epoxy resin curing agent having oxirane group, TGIC (triglycidyl isocyanurate) curing agent having oxirane group, curing agent having isocyanate group, curing agent having blocked isocyanate, curing agent having carboxyl end-group and aliphatic or aromatic curing agent including at least one of epoxide and anhydride reaction group.

The filler is a material helping heat diffusion, and is at least one selected from a group consisting of $Al_2O_3$, Al, BN and Cu coated with Ag. Cu is easily oxidized when the mixture is made. When Cu is oxidized, the performance of the mixture can be lower. Therefore, it is desirable that Cu is coated with Ag. Preferably, BN is used as the filler.

The dispersing agent is at least one selected from the group consisting of a polyamine amide based material, phosphoric acid ester based material, polyisobutylene, oleic acid, stearin acid, fish oil, ammonium salt of a polycarboxylic acid, sodium carboxymethyl and a mixture thereof.

The solvent is one or more selected from the group consisting of methyl ethyl ketone, ethanol, xylene, toluene, acetone, trichloroethane, butanol, methyl Isobuthyl ketone (MIBK), ethyl acetate (EA), butyl acetate, cyclo hexanone, water, propylene glycol mono methyl ether, MEK, anone and a mixture thereof.

Polyacrylate based material may be used as the leveling agent.

As described above, the heat dissipating layer 322 can be used for plasma display panel (PDP) and organic electroluminescent device (OELD) as well as the LCD device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A backlight unit, comprising:
   a light source for emitting a light;
   a reflector below the light source for reflecting the light emitted from the light source and absorbing heat generated by the light source;
   a heat dissipating layer including thermal conductive particles, the heat dissipating layer being disposed on and in direct contact with a first surface of the reflector for dissipating the heat transferred to the reflector;
   a light guide plate for guiding the light emitted from the light source, the light source being located at least one lateral side of the light guide plate; and
   a light source reflector above the reflector and surrounding the light source,
   wherein the reflector and the heat dissipating layer have a length larger than a length of the light guide plate and are disposed directly below the light source reflector for absorbing the heat transferred to the light source reflector.

2. The backlight unit of claim 1, wherein the thermal conductive particles include a graphite powder.

3. The backlight unit of claim 1, wherein the heat dissipating layer is formed of a mixture including a graphite powder, a binder, and a curing agent.

4. The backlight unit of claim 3, wherein the mixture further includes a filler, a dispensing agent and a solvent.

5. The backlight unit of claim 3, wherein the heat dissipating layer is in contact with the first surface of the reflector.

6. The backlight unit of claim 5, wherein the first surface of the reflector is a bottom surface of the reflector, and a top surface of the reflector faces the light source for reflecting the light emitted from the light source.

7. The backlight unit of claim 1, further comprising:
   a diffuser for diffusing the light from the light source; and
   a prism sheet for condensing the light diffused by the diffuser.

8. The backlight unit of claim 1, wherein the light source is at least one of a cold cathode fluorescent lamp (CCFL), a light emitting diode (LED) and an external electrode fluorescent lamp (EEFL).

9. A method of manufacturing a heat dissipating layer of claim 1, the method comprising:
   forming a mixture by mixing a graphite powder, a binder and a curing agent; and
   forming the heat dissipating layer by applying the mixture onto a first surface of a reflector.

10. The method of claim 9, wherein the step of forming the mixture further includes mixing a filler, a dispersing agent and a solvent with the graphite powder, the binder and the curing agent.

11. A display device, comprising:

a display panel for displaying an image by using a light;

a light source for emitting a light;

a reflector below the light source for reflecting the light emitted from the light source and absorbing heat generated by the light source;

a heat dissipating layer including thermal conductive particles, the heat dissipating layer being disposed on and in direct contact with a first surface of the reflector for dissipating the heat transferred to the reflector;

a light guide plate for guiding the light emitted from the light source, the light source being located at least one lateral side of the light guide plate; and a light source reflector above the reflector and surrounding the light source, wherein the reflector and the heat dissipating layer have a length larger than a length of the light guide plate and are disposed directly below the light source reflector for absorbing the heat transferred to the light source reflector.

12. The display device of claim 11, wherein the thermal conductive particles include a graphite powder.

13. The display device of claim 11, wherein the heat dissipating layer is formed of a mixture including a graphite powder, a binder, and a curing agent.

14. The display device of claim 13, wherein the mixture further includes a filler, a dispersing agent and a solvent.

15. The display device of claim 13, wherein the heat dissipating layer is in contact with the first surface of the reflector.

16. The display device of claim 15, wherein the first surface of the reflector is a bottom surface of the reflector, and a top surface of the reflector faces the light source for reflecting the light emitted from the light source.

17. The display device of claim 11, wherein the display device is one of a liquid crystal display device (LCD), a plasma display device (PDP) and an organic electroluminescent device (OELD).

* * * * *